Figure 6:
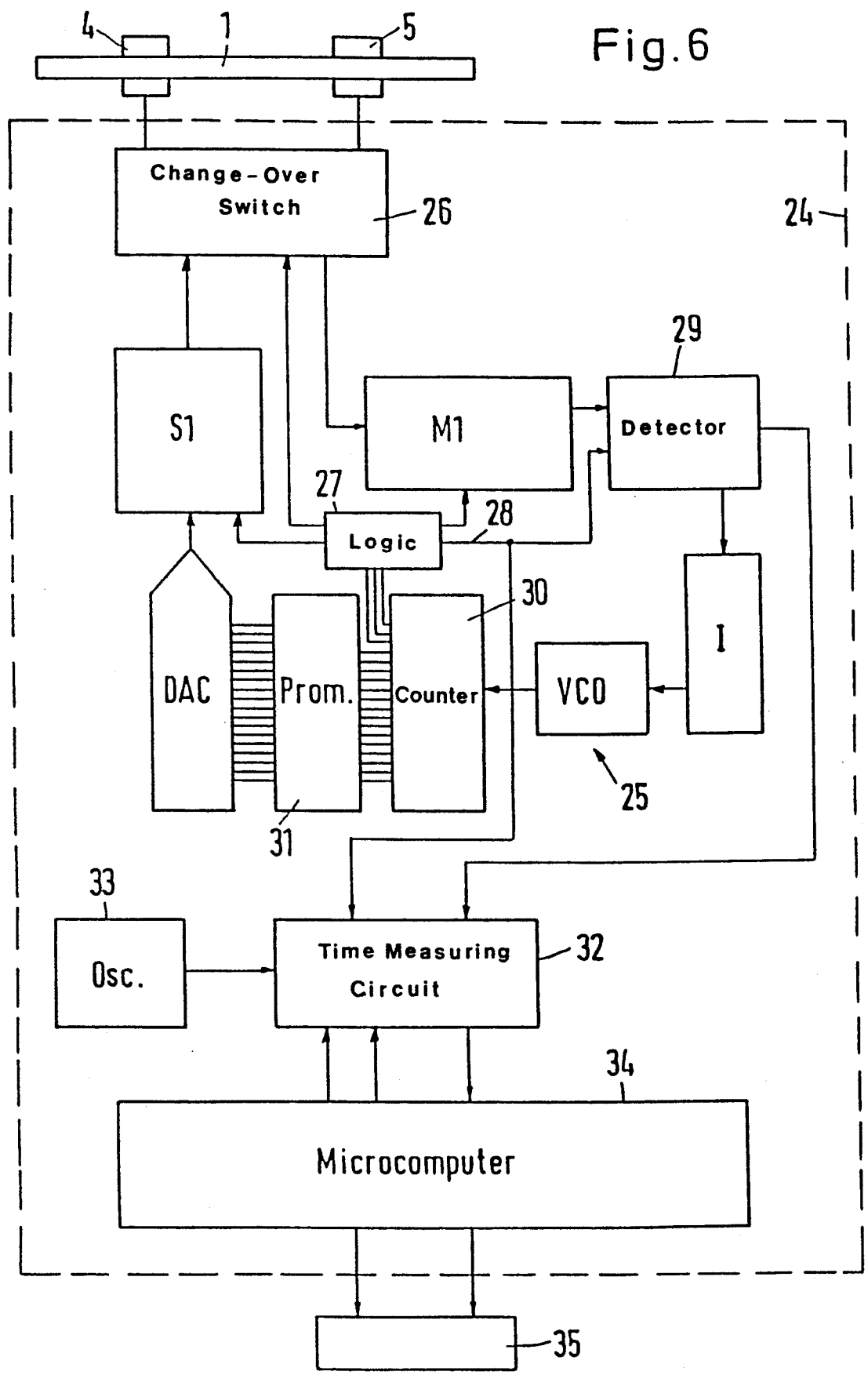

United States Patent [19]

Hansen et al.

[11] Patent Number: 5,069,075
[45] Date of Patent: Dec. 3, 1991

[54] MASS FLOW METER WORKING ON THE CORIOLIS PRINCIPLE

[75] Inventors: Henning M. Hansen; Frands W. Voss, both of Sønderborg, Denmark

[73] Assignee: Danfoss A/S, Nordborg, Denmark

[21] Appl. No.: 548,241

[22] Filed: Jul. 3, 1990

[30] Foreign Application Priority Data

Jul. 14, 1989 [DE] Fed. Rep. of Germany ....... 3923409

[51] Int. Cl.$^5$ ................................................ G01F 1/66
[52] U.S. Cl. ................................ 73/861.38; 73/861.18
[58] Field of Search ........... 73/861.18, 861.21, 861.27, 73/861.37, 861.38

[56]  References Cited
U.S. PATENT DOCUMENTS 4,949,583  8/1990  Lang .................................. 73/861.37

Primary Examiner—Herbert Goldstein
Attorney, Agent, or Firm—Wayne B. Easton; Clayton R. Johnson

[57]  ABSTRACT

The flow meter works on the Coriolis principle and has a measuring tube and at least two energy converters. At least one of the energy converters is an oscillation exciter for oscillating the tube to generate a wave traveling along the tube and an oscillation detector. An evaluating circuit uses the speed of travel of waves in the direction of flow of fluid through the tube and in the direction opposite the direction of flow to determine the mass flow of fluid through the tube.

13 Claims, 2 Drawing Sheets

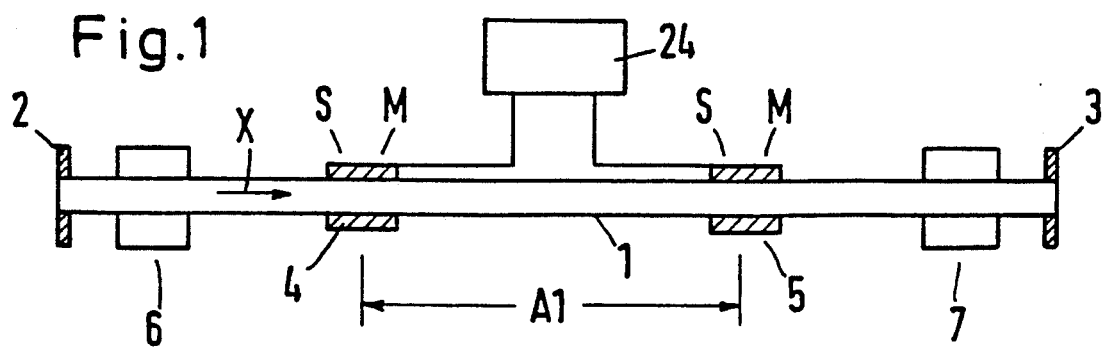
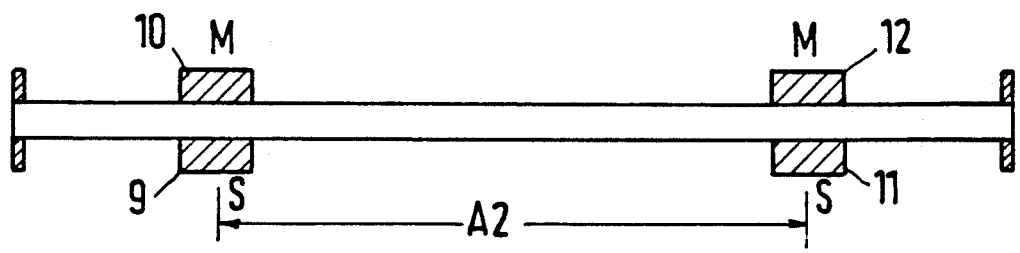
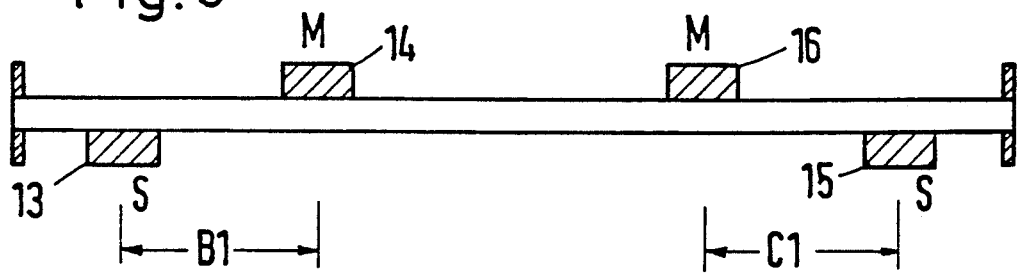
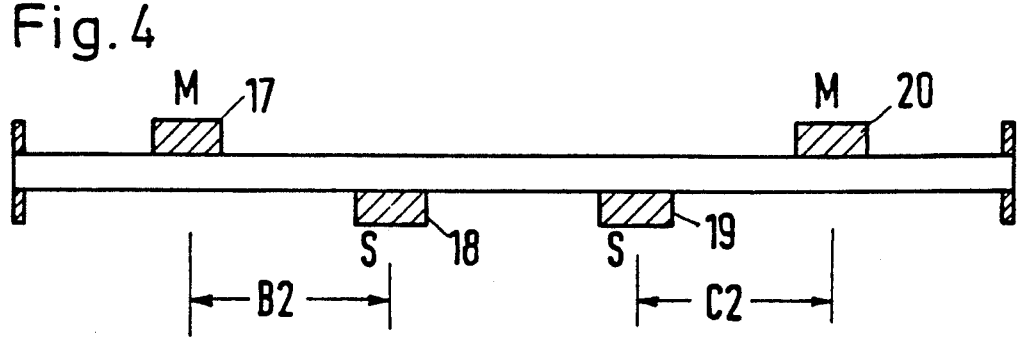
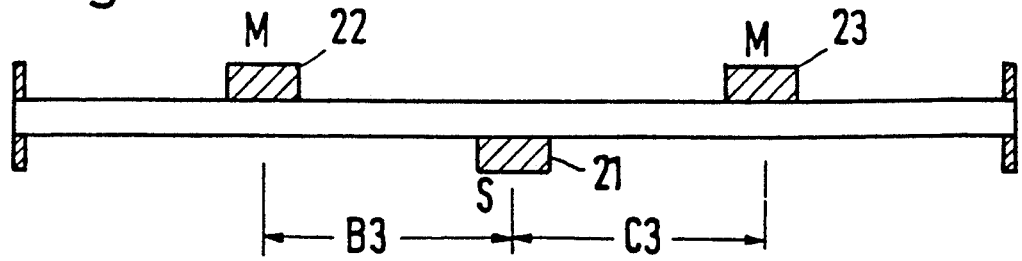

MASS FLOW METER WORKING ON THE CORIOLIS PRINCIPLE

The invention relates to a mass flow meter working on the Coriolis principle, comprising at least one measuring tube, at least two energy converters associated therewith in the form of oscillation exciters or oscillation detectors, and an evaluating circuit using energy converter signals to determine the mass flow.

Such meters are known in many forms, for example from EP-OS 0 282 217. They are based on the principle that a measuring tube made to oscillate at its resonance frequency is additionally deformed, depending on the mass flow, which leads to lagging of the first measuring tube section and leading of the second measuring tube section. The phase displacement is a direct measure of the value of mass flow.

In the known case, the measuring tube consists of a straight tube section provided with connecting flanges at both ends with resiliant bellows therebetween. The middle of the tube is associated with an oscillation exciter which, with the aid of a centrally disposed oscillation detector, oscillates the measuring tube at its resonance frequency. In front of and behind it, there is a respective further oscillation detector serving to determine the positive and negative phase displacement so that the phase difference can be evaluated.

This measuring device has a phase difference differing from zero even if there is no flow in the tube. The reason for this may be clamping forces, different temperature stresses, unevennesses in the tube material or in the flow medium, phase errors in the detectors or the associated circuits, and so on. It is therefore necessary to measure the phase difference that is present without flow after the meter has been built in and to correct the subsequent flow measurements by means of corresponding calibration. If a certain accuracy is required of the measurements, the calibration has to be checked regularly.

It is also known (U.S. Pat. No. 4,422,338) to avoid such manual error compensation in that use is made of a very special evaluating circuit with single or multiple integration of the output signal of the oscillation detectors. The measuring tube is substantially U-shaped so that the connecting flanges lie in one plane. This reduces the influence of clamping forces. However, the device has a complicated construction.

Also known are ultrasonic flow meters (DE-PS 34 38 976), in which two energy converters bounding an obliquely extending measuring path are provided at opposite sides of the tube wall but axially displaced from one another. They are utilized alternately as ultrasound generators and ultrasound receivers. The period of travel of the sound wave is measured in one direction and then in the other direction. The amount of flow can be determined from the times of travel and their difference (reciprocity principle). Zero point departures are suppressed. However, one disadvantage that remains is the dependence of the measurement on the flow profile, for which reason calibration must take place having regard to each medium to be measured.

The object of the invention is to provide a flow meter which requires no calibration either because of zero point departure or because of the flow profile.

This problem is solved according to the invention in that in and against the direction of flow waves can be produced which travel along the measuring tube, that at least one measuring path is provided to find the speed of travel in and against the direction of flow, and that the evaluating circuit determines the mass flow by utilising the two different speeds of travel.

This construction is based on the recognition that propagation of the travelling waves of the same frequency is not constant along a measuring tube loaded because of the flow by Coreolis forces but depends on the mass flow and the direction of travel. By taking the speed of travel into account in both directions, one can substantially suppress the zero point deviation. One thereby achieves the advantages of the Coreolis principle, (no dependence on the flow profile) and the advantages of the ultrasonic measuring method (no zero point departure) without having to accept their disadvantages. The invention is particularly suitable for very simply designed meters, for example those with a straight measuring tube, which have a marked departure from zero during normal measurement but this departure now being eliminated.

In a particularly simple embodiment, one or two substantially equally formed measuring paths are provided for measuring the travelling time of the waves in and against the direction of flow and the evaluating circuit processes the difference of the traveling times. The speed measurement can therefore be reduced to a pure measurement of the travelling time.

It is particularly favourable to provide a measuring path which is bounded by two energy converters which can be alternately driven as oscillation excite, and oscillation detectors. With the least possible constructional expense, one ensures that the same conditions apply to the measurement in the one direction of travel as they do in the other direction. Since the principle of reciprocity fully applies to this case, particularly good results are obtained. Similar results are achieved by providing a measuring path which is bounded at both ends by a respective oscillation exciter and an oscillation detector operable alternately in pairs.

However, there may also be two measuring paths if they are substantially the same. In this case, it is particularly recommended to provide two measuring paths which have a common oscillation exciter and a respective oscillation detector at the opposed ends. The common oscillation exciter ensures that travelling waves are generated in both directions at the same frequency without having to take any additional measures.

It is particularly favourable for the oscillation exciter to excite the measuring tube by means of a short train of oscillations of narrow band width. Excitation with a few oscillations will be sufficient to produce the travelling wave. The narrow band width leads to very accurate measuring results even with types of excitation in which the speed of travel depends on the frequency, for example in the case of bending oscillations. If there is no such dependency, use can also be made of wide band pulse to excite the oscillations.

In particular, the train of oscillations may consist of a few sinusoidal oscillations in an enveloping curve corresponding to the Gaussian function. In contrast with a square pulse, this product of bell curve and sinusoidal function leads to excitation with a very narrow band width.

It is also advantageous for the oscillation exciter to excite the measuring tube substantially at such a high frequency that measurement of the travelling time has taken place before reflections of the travelling wave at the point of clamping the measuring tube have reached the oscillation detector. The higher the frequency, the greater is the possibility that the oscillation detector can detect a starting zone of the travelling wave sufficient for accurately determining the time before the detection is impeded by reflections.

A particularly accurate measurement is obtained if the oscillation detector determines a predetermined passage through zero of the travelling wave for the purpose of measuring the time of travel. It may be the first or second passage through zero in a particular direction, which can be determined with high accuracy. By selecting a corresponding exciter frequency, one can ensure that this passage through zero is detected before there is interference from reflections.

In this connection, it is advisable for the measuring path to be associated on the side of the oscillation detector remote from the oscillation exciter with an oscillation damper that acts on the measuring tube. The oscillation damper ensures that reflections are returned only to a harmless extent to influence the measuring result. It is also an advantage for the oscillation exciter to excite the measuring tube at substantially such a frequency that the wave length of the travelling waves is substantially larger than the diameter of the measuring tube. This gives well defined and therefore easily detectable waves.

In a preferred embodiment, there is a regulating circuit for the exciting frequency of the oscillation exciter, which holds constant the wave length of the wave travelling along the measuring tube. It is under this condition that the difference in the travelling time of the wave in and against the direction of flow will be proportional to the mass flow.

In a preferred embodiment, provision is made for the regulating circuit to comprise an integrator which integrates departures in the arrival time of a desired value, for a voltage-controlled oscillator to convert the integration result to a cycle frequency, and for a store which is followed by a D/A converter to be readable with the aid of a counter operated at the cycle frequency to form a voltage which excites the oscillation exciter. Every departure of the arrival time from the desired value leads to a change in the cycle frequency and thus to a change in the exciting frequency of the oscillation exciter until the original condition has been re-established.

A preferred example of the invention will now be described in more detail with reference to the drawing, wherein:

FIG. 1 is a diagrammatic representation of a mass flow meter according to the invention, FIG. 2 shows a first modification, FIG. 3 shows a second modification, FIG. 4 shows a third modification, FIG. 5 shows a fourth modification, and FIG. 6 is a block diagram of one embodiment of an exciter and evaluating circuit.

FIG. 1 illustrates a straight measuring tube 1 carrying connecting flanges 2 and 3 at both ends so that it can be inserted in a tube circuit. There is a measuring path A1 bounded by a respective energy converter 4 and 5. These energy converters can each be operated as an oscillation exciter S and oscillation detector M. Between the measuring path A1 and the end flanges 2 or 3, there is a respective damping apparatus 6 or 7.

In the FIG. 2 embodiment, there is a measuring path A2, at the ends of which there are two energy converters 9, 10, 11 and 12, namely two oscillation exciters S and two oscillation detectors M. Of these, the pair 9, 12 and the pair 10, 11 are operated alternately.

In FIG. 3, there are two measuring paths. The measuring path B1 is bounded by the energy converter 13 in the form of a transmitter S and the energy converter in the form of an oscillation detector M, the measuring path C1 is bounded by the energy converter 15 in the form of an oscillation exciter S and the energy converter 16 in the form of an oscillation detector M.

In FIG. 4, there are again two measuring paths B2 and C2 with energy converters 17, 18, 19 and 20. The difference from FIG. 3 is that the position of the oscillation exciter S and oscillation detector M has been exchanged.

In FIG. 5, two measuring paths B3 and C3 are provided and they adjoin each other directly. In the middle, there is an energy converter 21 in the form of an oscillation exciter S. At the same spacing from it, there are two energy converters 22 and 23 in the form of oscillation detectors M.

The oscillation exciters can excite the measuring tube 1 in such a way that bending oscillations, displacement oscillations, torsion oscillations or other oscillations occur as travelling waves. Use is made of the fact that the propagation speed of the travelling waves depends not only on the stiffness and mass of the tube as well as the density of the flowing medium but also on the mass flow and its direction. The principle of the invention is therefore suitable for all measuring tubes which do not impede such propagation of the waves. If the medium to be measured is compressible, one should select oscillation excitations at which the compressibility will not detrimentally influence the measuring result.

The excitation may take place with a wide band voltage pulse. However, since the speed of travel often depends on the frequency, one obtains more accurate measuring results if excitation takes place at a definite frequency or with a short train of oscillations of narrow band width. Such a train of oscillations is obtained if a few sinusoidal oscillations, for example three or four, are employed in an enveloping curve which corresponds to the Gaussian function or bell curve. The frequency is desirably selected to be so low on the one hand that travelling waves are produced with a wave length which is much higher than the diameter of the measuring tube and so high on the other hand that a passage through zero serving for the certain determination of the arrival time has occurred at the oscillation detector before there is superimposition by wave sections that have been reflected at the clamping flanges 2 and 3. An exciter and evaluating circuit 24 determines the travelling time between commencement of the excitation of the travelling wave and the arrival at the oscillation detector M and from this determines the flow of mass. One should wait with the next oscillation excitation until the measuring tube 1 has come to rest again.

The oscillation exciters S can be operated electromagnetically, electrostatically, piezo electrically, hydraulically, magnetically, magnetostrictively, thermally or in some other known manner. In general, one part of the oscillation exciter is secured to the measuring tube 1 and a second part to a second measuring tube or fixed with respect to the housing.

The oscillation detectors M, which may be similarly constructed in two parts, respond to the position, speed or acceleration of the measuring tube. From the signals obtained, one can then find the starting section of the travelling wave, for example a predetermined positive passage through zero.

The oscillation detectors M may operate optically, piezo electrically, electromagnetically, magnetostrictively, or electrostatically, be in the form of strain gauges or operate in some other known manner.

The oscillation dampers 6 and 7 can, for example, be of corrugated tubing.

It will be assumed that in all the examples the direction of flow is X.

In the operation of the FIG. 1 embodiment, the measuring tube 1 is first of all caused to oscillate with the aid of the energy converter 4. The travelling time of the wave thus created in the direction of flow X is determined with the aid of the energy converter 5. The latter is then used as an oscillation exciter S and the time of travel of the wave in the opposite direction is determined by the energy converter 4. The difference between these two travelling times, which is also a measure of the difference between the travelling speeds, is processed in the exciter and evaluating circuit 24.

It can be shown that:

$$Q_m = V_x \times M_u$$
$$= D_t \times \omega^2 \times T_{t-} \times T_{t+} \times E \times I/L^3$$

wherein
$Q_m$ = mass flow
$V_x$ = speed of the flowing medium
$M_u$ = mass of the flowing medium
$\omega$ = exciter frequency as circuit frequency
$T_{t+}$ = time of travel of wave along measuring path in flow direction X
$T_{t-}$ = time of travel of wave along measuring path against flow direction X
$D_t$ = difference $T_{t-} - T_{t+}$
$E$ = modulus of elasticity
$I$ = moment of inertia
$L$ = length of measuring path.

The travelling time $T_t$ obtained without mass flow is calculated from $(T_{t-} + T_{t+})/2$. Since the frequency is readily found and the other parameters are constant, the mass flow can be calculated without difficulty.

If one keeps the expression $(T_{t-} \times \omega)$ or $(T_{t-} \times T_{t+} \times \omega^2)$ constant, the mass flow will only depend on the difference $D_t$ in the travelling times. This can be effected by a regulating circuit 25 in the exciter and evaluating circuit 24, which ensures that the wave lengths are kept constant at the tube. For example, in the case of a change in the travelling time, one can determine the alteration factor and subsequently divide the frequency by this factor. This can, for example, be achieved with the aid of a loop having a closed phase. Attention is drawn to the example of FIG. 6.

The FIG. 2 embodiment functions similarly because the pairs of energy converters 9 and 12 or 11 and 10 are alternately made effective. Here, again, the travelling time of the waves is measured alternately on the same measuring path A2 in the direction of flow X and against the direction of flow X.

In the FIG. 3 embodiment, the measuring path B1 serves to measure the travelling time in the direction of flow X and the measuring path C1 serves to measure the flow against the direction of flow X. The measurement can take place alternately or simultaneously. In the FIG. 4 embodiment, the measuring path B2 serves to measure the travelling time against the direction of flow X and the measuring path C2 serves to measure the travelling time in the direction of flow X. Again, the measurements may take place alternately or simultaneously.

In the FIG. 5 embodiment, the measuring path B3 serves to measure the travelling time against the direction of flow X and the measuring path C3 serves to measure the travelling time in the direction of flow X. Here, too, the measuring paths may be utilized alternately or simultaneously.

In all cases, the conditions are similar to those described in conjunction with FIG. 1. Their measuring accuracy is, however, somewhat lower because the reciprocity condition is not accurately fulfilled but only approximated.

The drawings only show straight measuring tubes. However, any other shapes of measuring tube are possible, especially U-shaped and loop-like tubes. The only prerequisite is that they should not hinder the propagation of travelling waves.

FIG. 6 illustrates one embodiment of an exciter and evaluating circuit 24 with a built-in regulating circuit 25. The two energy converters 4 and 5 are alternately connected to the exciting transmitter circuit S1 and the detecting receiver circuit M1 with the aid of a changeover switch 26. This manner of operation is controlled by a logic circuit 27. The latter also predetermines a particular time of arrival (desired value) at the outlet 28. A detector 29 compares this desired value with the existing value determined by the receiver circuit M1. The departure is integrated in an integrator I. The integration result is converted in a voltage-controlled oscillator VCO into a frequency which is proportional to the voltage. This frequency constitutes the cycle frequency for a counter 30 which, on the one hand, controls the logic circuit 27 and on the other hand calls for digital values from a store 31 (PROM) that are converted into a voltage in a digital/analogue converter DAC. To excite the oscillation exciter with the aid of the transmitter circuit S1, use is made of a counter run which produces three or four sinusoidal oscillations in a bell-shaped enveloping curve. If the travelling time is too high relatively to the desired value, the cycle frequency of the VCO and thus the exciter frequency will drop and, if the travelling time is too low, the cycle frequency will rise.

In this way, the product of the travelling time $T_t$ and the frequency $\omega$ is kept constant. The mass flow now only depends on the difference in travelling times.

To determine this, the desired value predetermined by the logic circuit 27 and the departure determined by the detector 29 are fed to a time measuring circuit 32 of which the time scale is fixed by an oscillator 33. The travelling times found each time in the direction of flow and against the direction of flow are evaluated by a microcomputer 34. The result can be detected in an outlet apparatus 35 such as a display, printer or the like.

We claim:
1. A mass flow meter working on the Coriolis principle, comprising, at least one measuring tube for having fluid flow therethrough in a fluid flow direction, oscillation exciter means for oscillating the tube to generate waves to travel along the tube in both directions, and oscillation detector and evaluator means for detecting the speed of travel of the waves in both said directions to determine the mass flow of fluid through the tube.

2. A meter according to claim 1, characterized in that two measuring paths are provided to measure the travelling times of the waves travelling in and against the direction of flow.

3. A meter according to claim 2, characterized in that said measuring paths are adjoining with said oscillation excited means being at opposite ends thereof and said oscillation detector means being therebetween.

4. A meter according to claim 1, characterized in that a measuring path is provided which is bounded by two energy converters operable alternately as said oscillation exciter means and said oscillation detector means.

5. A meter according to claim 4, characterized in that said measuring path is bounded at both ends by said oscillation exciter generator means and said oscillation detector means which are alternately operable in pairs.

6. A meter according to claim 1, characterized in that said oscillation exciter means excites the measuring tube via a short train of oscillations having a narrow band width.

7. A meter according to claim 6, characterized in that said train of oscillations consists of a few sinusoidal oscillations in an enveloping curve corresponding to a Gaussian function.

8. A meter according to claim 6, characterized in that said measuring tube is clamped at opposite ends thereof, said oscillation exciter means being operable to excite said tube with a sufficiently high frequency that measurement of the travelling time occurs before reflections of the travelling wave from a clamping point of the measuring tube reach said oscillation detector means.

9. A meter according to claim 1, characterized in that said oscillation detector means measures the travelling time of said waves based on a predetermined passage of said waves through zero.

10. A meter according to claim 1, characterized in that an oscillation damper acting on the measuring tube is associated with said measuring path on the side of said oscillation detector means remote from said oscillation exciter means.

11. A meter according to claim 1, characterized in that said oscillation exciter means excites the measuring tube at such a frequency that the wave length of the travelling waves is substantially larger than the diameter of the measuring tube.

12. A meter according to claim 1, characterized by a regulating circuit for the exciter frequency of said oscillation exciter means that holds constant the wave length of the wave travelling along the measuring tube.

13. A meter according to claim 12, characterized in that said regulating circuit comprises an intergrator which intergrates departures of the arrival time from a desired value, a voltage-controlled oscillator which converts the integration result into a cycle frequency, a store for forming a voltage for exciting said oscillation exciter means, and a D/A converter which can be read with the aid of a counter operated at the cycle frequency.

* * * * *